United States Patent Office 2,923,713
Patented Feb. 2, 1960

2,923,713

ISONICOTINIC ACID, BENZYL AND p-METHOXY-BENZYL HYDRAZIDES

Herman Herbert Fox, Passaic, N.J., assignor to Hoffmann-La Roche Inc., Nutley, N.J., a corporation of New Jersey No Drawing. Original application March 7, 1952, Serial No. 275,250. Divided and this application February 5, 1958, Serial No. 713,302

2 Claims. (Cl. 260—295)

This application relates to novel compounds which are anti-tubercular agents. The invention embraces the compounds in the form of their free bases as well as acid addition salts thereof.

The compounds are:

1-isonicotinyl-2-benzylhydrazine
1-isonicotinyl-2-(p-methoxybenzyl)hydrazine.

The preparation of the compounds is illustrated by the following examples. Where the compounds are obtained in the form of the free bases, the latter can be readily converted to the acid addition salts on treatment with acids, e.g., hydrochloric acid, hydrobromic acid, nitric acid, sulfuric acid, phosphoric acid, ethane sulfonic acid, tartaric acid, and the like. Where the compounds are isolated in the form of acid addition salts, the latter can be converted to the free bases by treatment with an alkali, for example, sodium hydroxide or ammonium hydroxide. It is to be understood that the claims are to be construed as also embracing salts of the bases.

Example A

A mixture of 13.7 grams of isonicotinylhydrazine and 15 grams of anisaldehyde was heated on a steam-bath. Partial solution occurred followed by solidification of the reaction mixture to produce 1-isonicotinyl-2-(p-methoxybenzylidene)hydrazine. Upon crystallization from xylene, the compound was obtained in the form of lustrous white flakes; M.P. 171.5–173.5° C.

Example 1

A solution of 4.5 grams of 1-isonicotinyl-2-benzylidenehydrazine in 130 cc. of methanol was treated with 20 cc. of concentrated ethanolic hydrogen chloride, and the resulting solution was reduced with hydrogen at room temperature at 40–50 lbs. per square inch pressure in the presence of 0.15 gram of platinum oxide as a catalyst. The reduction was stopped when 1 molar equivalent of hydrogen had been used. The dihydrochloride of 1-isonicotinyl-2-benzylhydrazine precipitated as the reduction proceeded. To facilitate removal of the catalyst, sufficient water was added to the reaction mixture after reduction was complete to dissolve the precipitate. The mixture was filtered, the filtrate concentrated to small volume, and then made alkaline with ammonium hydroxide to give a precipitate of the free base. Upon recrystallization from benzene, the 1-isonicotinyl-2-benzylhydrazine was obtained in the form of white needles, M.P. 119.5–120.5° C.

Example 2

A solution of 5.1 grams of 1-isonicotinyl-2-(p-methoxybenzylidene)hydrazine in 130 cc. of methanol was treated with 20 cc. of concentrated ethanolic hydrogen chloride, and the resulting solution was reduced with hydrogen at room temperature and 40–50 lbs. per square inch pressure, in the presence of 0.15 gram of platinum oxide as a catalyst. The reduction was stopped when 1 molar equivalent of hydrogen had been used. The dihydrochloride of 1-isonicotinyl-2-(p-methoxybenzyl)hydrazine precipitated as the reduction proceeded. The precipitate was filtered off together with the catalyst and was then dissolved in water and filtered again to remove the catalyst. The aqueous filtrate was made alkaline with dilute ammonium hydroxide and then neutralized with acetic acid, whereupon the free base, 1-isonicotinyl-2-(p-methoxybenzyl)hydrazine was obtained. Upon crystallization from benzene, the compound melted at 116–117° C.

This application is a division of my copending application Serial No. 275,250, filed March 7, 1952, now abandoned.

I claim:
1. 1-isonicotinyl-2-benzylhydrazine.
2. 1-isonicotinyl-2-(p-methoxybenzyl)hydrazine.

References Cited in the file of this patent

Meyer et al.: Monatshefte für Chemie, vol. 33, p. 401 (1912).

Selikoff et al.: The Quarterly Bull. of Sea View Hosp., vol. XIII, p. 20, January 1952.